May 11, 1948.   V. PETERS   2,441,507
APPARATUS FOR ARC WELDING
Filed Dec. 11, 1944   2 Sheets-Sheet 2
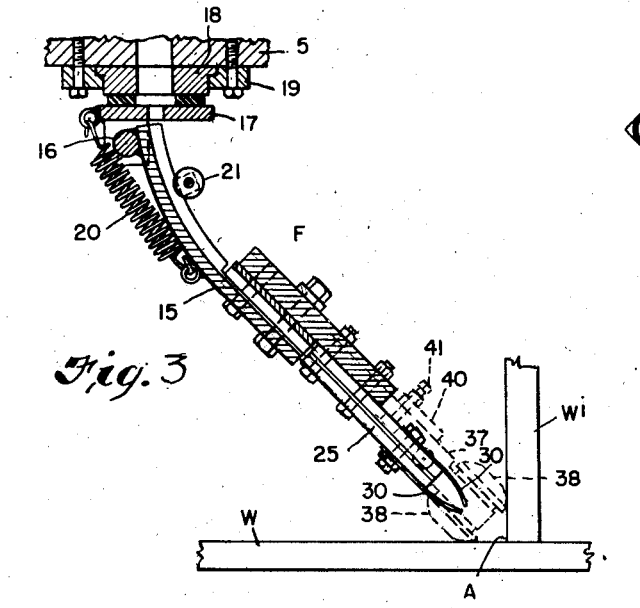
Fig. 3
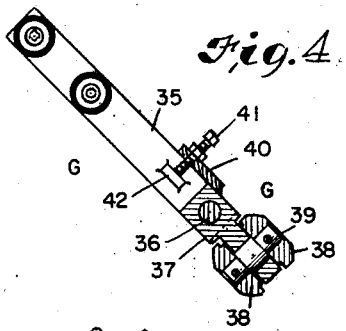
Fig. 4
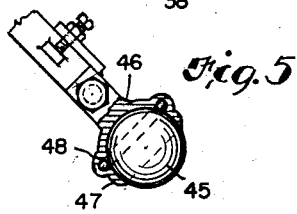
Fig. 5
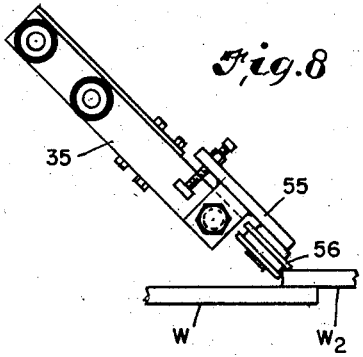
Fig. 8
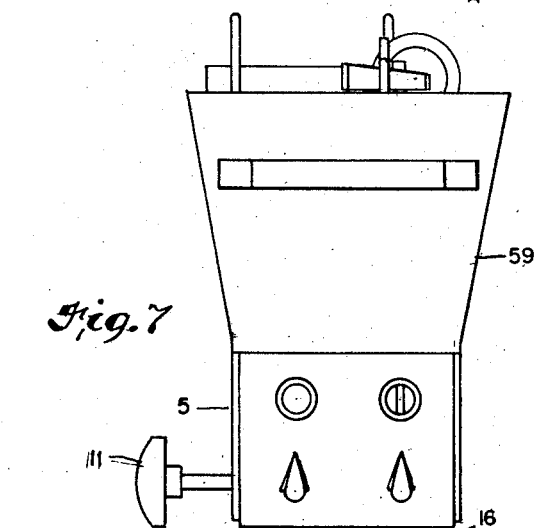
Fig. 7
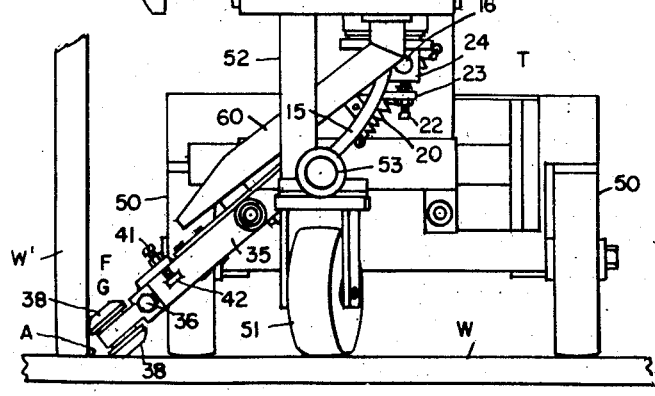
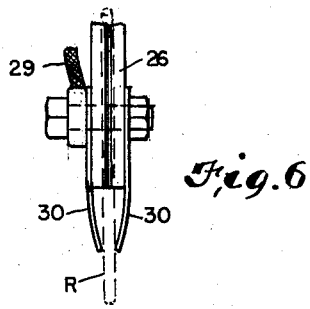
Fig. 6
INVENTOR.
VLADIMIR PETERS
BY
Oberlin + Limbach
ATTORNEYS Patented May 11, 1948

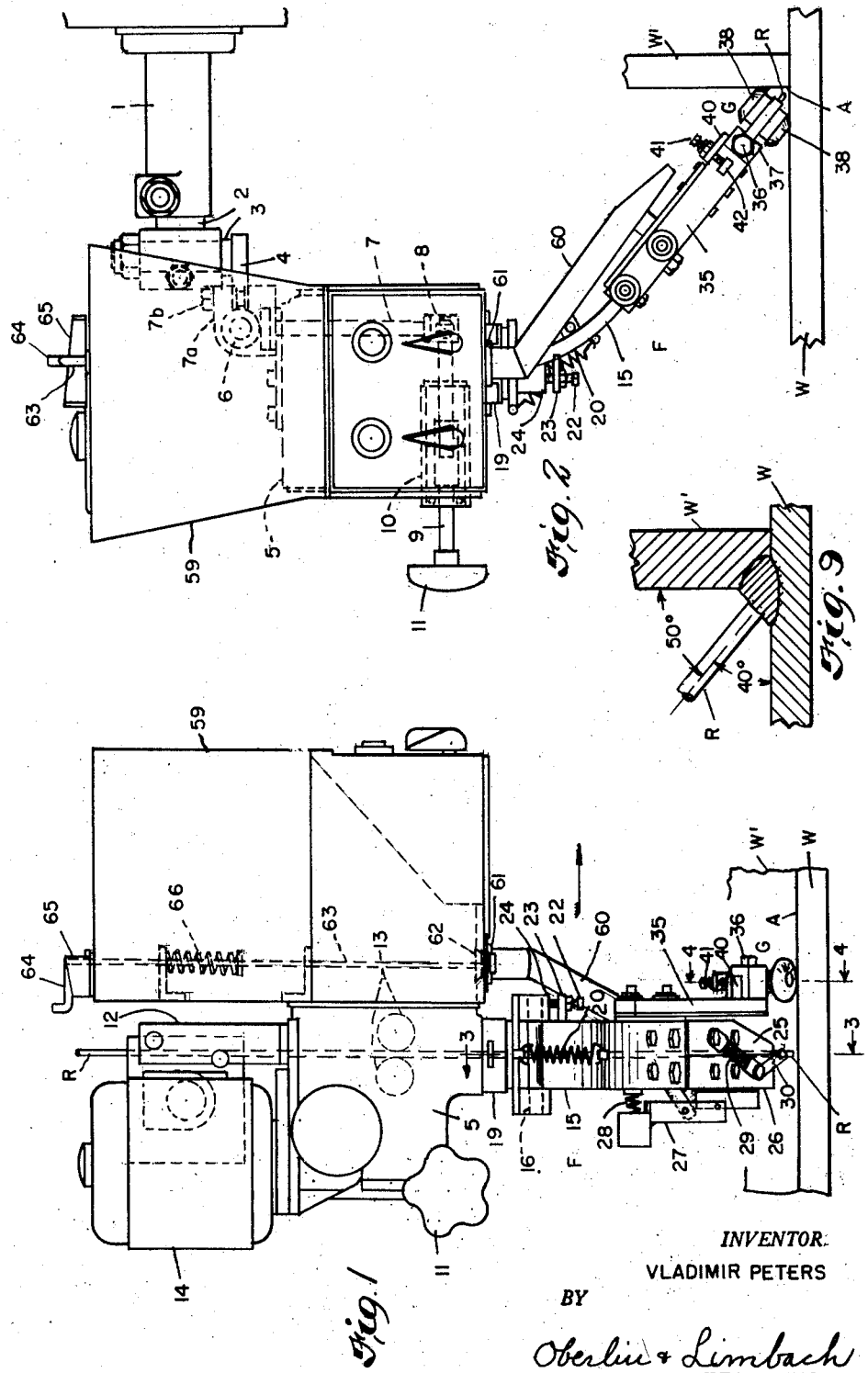

2,441,507

UNITED STATES PATENT OFFICE 2,441,507

APPARATUS FOR ARC WELDING

Vladimir Peters, Lakewood, Ohio, assignor to The Lincoln Electric Company, Cleveland, Ohio, a corporation of Ohio Application December 11, 1944, Serial No. 567,600

10 Claims. (Cl. 219—8)

The present improvements, relating as indicated to apparatus for arc welding, have more particular regard to the provision of such an apparatus in which a metallic weld rod or wire is automatically fed to the work, such wire being connected with one side and the work with the other of a generator or equivalent source of welding current.

In certain respects the present invention may be regarded as an improvement in the form of such arc welding apparatus which is shown and described in the co-pending application of E. A. Smith, filed March 16, 1943, Serial No. 479,349, now Patent Number 2,364,826, dated December 12, 1944.

One principal object of the present improvements is to enable an apparatus of the type in question to be more effectively utilized in making so-called fillet welds, i. e. welds in the corner between two angularly related parts which are to be united together. To this end it is desirable that the weld rod be fed to the work on a definite line approximately bisecting the angle between the parts to be welded, so that the meeting edges of the latter will be properly interfused in forming the desired fillet in the corner therebetween; and it should be possible to accomplish this quickly and easily without it being necessary to position the welding head, including appurtenant parts, or adjust the guide-roll for each particular operation. It will also ordinarily be desirable where, as is usually the case, one member is horizontally and the other vertically disposed, that the arc fuse somewhat more deeply into the lower edge of the vertically disposed member than into the upper surface of the horizontal member.

Heretofore in apparatus for fillet welding the welding head has had to be angularly adjusted and, due to clearance requirements, a compromise has had to be made between the angle of feed and the size of the head, with the result that such apparatus can only handle straight electrodes of limited length involving costly starts and stops.

Provision is accordingly made in the present apparatus not only for feeding the weld rod in desired angular relation to the work-pieces without requiring the angular position of the welding head to be changed, but for automatically maintaining such angle as the welding operation proceeds, despite the irregularities which may be encountered in the work-pieces or their relative placement. Furthermore, the apparatus is so constructed as to be capable of operation under an overhanging work-piece or part. Means are also provided for supplying a deep layer of flux to the work along the line of the weld, such flux being thus supplied in a manner to bank the same against the vertical surface and not merely to cover the horizontal surface involved. Still a further object is to provide means for removing from the end of the weld rod solidified flux that may adhere thereto from the portion of such deep layer as is rendered molten, when a particular operation is completed.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is a side elevation of the present improved arc welding apparatus, shown in proper relation to form a fillet weld between two angularly related work-pieces;

Fig. 2 is a side elevation of the same;

Fig. 3 is a vertical section of a portion of such apparatus, the plane of the section being indicated by the line 3—3 Fig. 1;

Fig. 4 is a similar vertical section of another portion of the apparatus, the plane of such section being indicated by the line 4—4 Fig. 1;

Fig. 5 is a view similar to that of Fig. 4 but showing a modification in construction;

Fig. 6 is a view of a detail of the apparatus as shown in Fig. 3, but on a somewhat larger scale;

Fig. 7 is a view corresponding to that of Fig. 2 but illustrating another modification in construction, more particularly in the means by which the welding apparatus proper is movably supported in relation to the work;

Fig. 8 is a view corresponding to Fig. 3 but showing still another modification whereby the welding apparatus is adapted for lap welding in contradistinction to fillet welding; and Fig. 9 is a diagrammatic sectional view of the improved form of fillet weld obtainable by the present apparatus.

Referring to the general illustration of the apparatus afforded by Figs. 1 and 2, it will be noted that such apparatus as a whole is mounted so as to depend above the one work-piece W, shown as being horizontally disposed and adjacent the other vertically disposed work-piece W' which rests upon such first work-piece so as to provide therebetween an angle A in which the fillet weld is to be formed. The parts W, W', which are thus to be welded together, are shown as plates, and they will be suitably clamped to a support (not shown), and either such support or the support for the welding apparatus will be movably mounted so that the latter may be caused to traverse along the line of angle A as the weld rod R is fed to the work.

In the illustrated construction it is the apparatus which is designed to be thus movable, to which end it is supported from a bracket 1 carried by a suitable traversing mechanism (not shown). Secured in such bracket for adjustable movement transversely of the line to be welded is an arm 2, in the outer end of which is rotatably adjustably secured a stub shaft 3. To the lower end of the latter is attached the welding apparatus proper together with the flux feeding device, as will now be described.

The weld rod or wire feeding mechanism, which comprises one main part of such welding apparatus, is contained in a box-like housing 5 that is hung for oscillatory movement about a projecting arm or bracket 4 on the lower end of shaft 3, being supported in a bearing 6 which constitutes a horizontal axis at right angles to that of said shaft. Depending from bracket 4, adjacent one rear corner of the housing, is an arm 7 to the lower end of which is connected by means of a hinged joint 8 one end of a rotatable shaft 9, extending along one side of said housing, that has threaded engagement with a bracket 10 attached to the lower forward corner thereof. The corresponding end of the shaft projects forwardly of the housing and carries a handle or knob 11, conveniently disposed to be grasped by the operator for the purpose of rotating said shaft. Arm 7 is adapted to be rigidly secured to bracket 4 by means of a split clamp 7a and bolt 7b, and when so secured, rotation of shaft 9 in one direction or the other serves correspondingly to oscillate the housing 5 about axis 6. However, by loosening the bolt 7b, the arm 7 and thus the housing 5, with all appurtenant parts, are left free to swing around the horizontal axis provided by bearing 6. Furthermore, the location of this axis is such that the mass of the casing and appurtenant parts will lie to one side thereof, the left as viewed in Fig. 2, with the result that the casing will tend thus to swing in counterclockwise direction as thus viewed.

The weld rod or wire R as it is received by the apparatus is conducted by suitable guide means 12 between a pair of feed rolls 13 located within housing 5 and connected to be driven in unison through suitable gearing by means of a small electric motor 14 mounted on the upper face of the housing. Since such driving means form no part of the present invention, it has been considered unnecessary to show the same; however, a preferred arrangement of such driving means will be found described in the co-pending application Serial No. 479,349.

Attached to the under face of housing 5, in line with the path of travel of the weld rod or wire as it leaves the feed rolls 13 is a device F for guiding such rod or wire to the work and supplying the welding current thereto.

The main element of this device, as best shown in Fig. 3, is a downwardly extending curved guide member 15 that is hingedly attached at its upper end about a pivot 16 to the under side of an annular plate 17. The latter is in turn fixedly secured, but insulated from, a flanged supporting ring 18 that is in turn secured to the under side of housing 5 by means of clamps 19. By slightly loosening the latter, said supporting ring may be rotated so as to swing device F as a whole about the axis of the weld rod or wire as it is received in the device. A tension spring 20, attached at one end to member 15 and at the other to plate 17, tends to swing the latter in the direction of its convex side, i. e. to the left as illustrated both in Fig. 3 and in Fig. 2.

The curved portion of member 15 is grooved on its concave side to provide a guide for the weld rod or wire, and one or more rollers 21 are provided to hold the wire in such groove. The extent of the swinging movement imparted by means of spring 20 and thus to the device as a whole may be regulated by means of a set screw 22 mounted in a lug 23 on one side of said member and adapted to contact with a stop 24 which at the same time forms one of the bearings for the pivot 16.

For the purpose of supplying welding current to the weld rod or wire as it is fed downwardly through device F, two contact members 25 and 26 are provided, being attached to the lower straight portion of member 15. As shown, said contact 25 is thus fixedly attached while contact 26 is capable of slight transverse movement relatively to said first contact, a lever 27 being actuated by a spring 28 to press such last-mentioned contact towards the other, so that the wire as it is fed downwardly will be pressed therebetween. The two contacts are electrically connected by a flexible conductor 29 and current will be supplied to such fixed contact by another conductor (not shown).

The contacts 25 and 26 will be made of copper, as usual, and secured to the latter so as to project downwardly therefrom at an angle are two spring strips 30 of steel or other hard metal (see Fig. 6), the lower ends of which curve inwardly so as to intersect the path of travel of the wire as it leaves the contacts, such ends being bent in sufficiently so as to engage the surface of such wire on opposite sides. These plates are utilized in removing adherent flux from the projecting end of the weld rod at the end of a welding operation, as will be later described.

Also attached to the lower portion of member 15 is the guide device G the detailed construction of which is best shown in Fig. 4. Such attachment is had by means of an arm 35 detachably secured to the side of member 15 opposite that whereon lever 27 and spring 28 are mounted, the lower end of such arm projecting downwardly alongside, but slightly spaced from, contact 25. Said arm will of course be electrically insulated from member 15 and thus from said contact member. Pivotally attached to the lower end of said arm 35 by means of a set bolt 36, is a bracket 37 which carries a rotatable guide member, substantially spherical in form. In the form shown in Fig. 4, this member actually comprises two substantially spherical segments 38 which are spaced apart and respectively pinned, welded or otherwise fixedly secured to opposite ends of a short spindle 39, rotatably mounted in the extending portion of bracket 37.

The axis of rotation of this spherical guide member is at right angles to the axis formed by bolt 36 about which the bracket is adjustable and the axis of the latter is aligned with the contact members 25 and 26, or more exactly stated, intersects and lies at right angles to the path of travel of the wire R as it is fed downwardly between said contacts. Bracket 37 is provided with an upwardly extending arm 40 which carries a set screw 41 adapted to contact with a lug 42 that projects from one side of arm 35. Accordingly, by loosening bolt 36 about which said bracket is pivoted, adjusting said set screw in one direction or the other, and then tightening the bolt with the set screw in contact with lug 42, the angular relation of the bracket to the arm may be varied within limits.

The operation of the apparatus as thus far described may be conveniently set forth at this point. Assuming that, as illustrated in Figs. 1, 2 and 3, a fillet weld is to be formed between angularly related work-pieces W and W', such work-pieces will be laid in proper relation to the traversing support for the housing 5 and the latter adjusted thereon so that the curved feed member 15 of device F will be inclined towards the angle A between such work-piece. The clamp nut 7b will be loosened, so that the entire apparatus including such device F will tend to swing in a direction to press the lower end of the latter against the vertical work-piece. At the same time the action of spring 29, added to the weight of device F and the resistance of the weld rod to bending will press the lower end of the device downwardly against the horizontal work-piece, with the result that the rotary guide member of device G is caused to ride in such angle.

Following proper setting of devices F and G, as just described, the wire is fed at a predetermined rate corresponding with the rate of traverse of the apparatus as a whole along the seam to be welded, the necessary welding current being simultaneously supplied to the contacts 25 and 26. Also, as will be presently described, a layer of flux will desirably be deposited slightly in advance of the point of welding, or in other words, of the arc formed between the wire R and the work-piece. By hinging and spring loading device F in the manner described the guiding means G will be held continuously in contact with the work-pieces regardless of irregularities and therefore insures that the weld rod or wire as it is fed to the latter will at all times be maintained at the predetermined angle.

The adjustment of the rotary guide member will preferably be such that the wire R, instead of being fed into such angle on a line bisecting the same, i. e. at an angle of 45° to the respective work-pieces, will be thus fed on a line 40° from the horizontal work-piece and 50° from the vertical work-piece, since we have found that this disposition will result in interfusion of more nearly equal portions of the two work-pieces and the production of a superior weld. This result will be found diagrammatically illustrated in Fig. 9.

The alternative form of guide illustrated in Fig. 5 differs from that illustrated in Fig. 4 in that an actual sphere 45 is used as the guide element, the bracket 46 which otherwise corresponds with bracket 37 being formed with an encircling flange 47 which retains such spherical guide member seated on a ball bearing race 48. Accordingly, in this modified construction the guide member, it will be seen, may freely rotate in all directions and thus accommodate the device even more readily to such irregularities as may be encountered in the work-pieces.

The modification illustrated in Fig. 7, as indicated in the general description of said figure, relates wholly to the manner in which the apparatus as a whole is mounted for traversing movement. Thus in the figure referred to the housing 5 with all appurtenant parts, instead of being supported from above, is mounted on a truck T which may be self-propelled if desired, and in any event, is designed to be movably supported by means of its wheels 50 and 51 on the horizontal work-piece W. One such wheel 51, the front wheel having regard to the direction of travel of the truck, is mounted for angular adjustment about a vertical axis 52, being retained in adjusted position by friction or suitable clamping means and a projecting handle 53 being provided to swing said wheel as desired. As illustrated in Fig. 7, this wheel or roller will be toed in, i. e. inclined towards the vertical work-piece W'. As a result, the truck as it is moved along the work-pieces tends to crowd wire feeding device F with the attached guide device G toward the angle A between the two work-pieces.

By a slight modification in the form of guide device, as illustrated in Fig. 8, the apparatus may be readily adapted for use in lap welding. For this purpose the bracket 55 on the lower end of arm 35, such bracket in other respects corresponding with bracket 37, carries a peripherally grooved roller 56 so disposed as to ride on the edge of the overlapping plate $W^2$. Through the adjusting means provided for bracket 55, the weld rod or wire may be accurately guided along the desired line of feed into the angle formed between said plate $W^2$ and the underlying plate W.

As previously indicated, the apparatus will desirably include means for depositing a layer of granular flux in advance of the welding point. To this end a flux hopper 59 is attached to the forward face of housing 5, having regard to the direction of relative movement between the apparatus and the work. The tube or trough 60 through which the flux is discharged from said hopper, as best shown in Figs. 2 and 7, will be inclined at an angle corresponding generally with the angle at which the lower straight portion of the device F is disposed. Furthermore, such discharge tube will terminate some distance from both the horizontal work-piece and the vertical work-piece W' and be so related thereto that the stream of granular flux as it falls will strike against the opposed face of such vertical work-piece. As a result, the deposited layer of flux will tend to pile up against the face in question and as it seeks its angle of repose will closely fill the angle between the work-pieces. The necessary depth of flux for operating with a so-called submerged arc may accordingly be achieved with use of a minimum amount of material.

The clamp 61 whereby the upper end of tube or trough 60 is secured to the under side of hopper 59 will be of a type to permit adjustment about a vertical axis, just as in the case of device F, and means are also provided in order to control and regulate the discharge of flux through tube or trough 60. Such means (see Fig. 1) comprise a valve 62, adapted to seat in the discharge opening of the hopper, which is attached to the lower end of a rod or stem 63. The upper end of the latter projects above the top of the hopper and carries a laterally projecting handle 64 adapted to rest on an arcuate cam 65, so that by rotation of the handle the valve may be raised, against the opposing action of a spring 66, to permit the flux to flow at desired rate.

As is well known in the operation of welding through a deep layer of flux such as has been described, a substantial portion of such layer is rendered molten by the heat of the arc and then solidifies upon the welded seam. Removal of such layer of solidified flux presents no particular problem; however upon interrupting a welding operation some of the molten flux also tends to cling to the projecting end of the weld rod and following solidification has to be removed before the operation can be resumed.

The action of the spring 20, it should be noted, is supplemental to that of gravity and the swinging movement of the weld rod feeding device F may, if desired, be left dependent on the latter solely, supplemented by the resistance of the weld rod to bending as it engages the concave side of member 15. Actually, as previously noted, the device F, in addition to being swingable about its own pivotal axis 16, is also swingable with the apparatus as a whole about axis 6, which lies in parallel relation to such axis 16. The only function of the stop 23 is to prevent the device from swinging too far to the left, as viewed in Fig. 2, so as to kink the weld rod or wire.

The term "weld rod" as used herein will be understood to connote generally any type of metallic, i. e. fusible, electrode which is melted down by the heat of the arc as it is fed toward the work. Such weld rod, however, should be of sufficiently small diameter to permit its being flexed as required in the operation of the apparatus just described, and ordinarily it will be in the form of a wire and will be supplied to the apparatus from a reel (not shown). While the weld in the case of plates disposed in overlapping relation, as illustrated in Fig. 8, is ordinarily spoken of as a lap weld, the edge of the upper plate actually forms an angle with the surface of the lower plate very similar to that encountered in fillet welding; accordingly it will be understood that in referring to angularly related work-pieces it is intended to include plates so disposed in relation with each other as to form an angle wherein the welding operation is carried out irrespective of the actual angular relation of the plates to each other.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. In apparatus for metallic arc welding angularly related work-pieces, the combination of a support mounted for traversing movement relatively to the latter in a direction substantially parallel with the angle therebetween, and a weld rod guiding device swingably attached to said support so as to be movable transversely of the line of such movement, said device being rotatably adjustable about a substantially vertical axis.

2. In apparatus for metallic arc welding angularly related work-pieces, the combination of a support mounted for traversing movement relatively to the latter in a direction substantially parallel with the angle therebetween, and a weld rod guiding device swingably attached to said support so as to be movable transversely of the line of such movement, said device including a curved depending member grooved on its concave face to receive and direct such weld rod.

3. In apparatus for metallic arc welding angularly related work-pieces, the combination of a support mounted for traversing movement relatively to the latter in a direction substantially parallel with the angle therebetween, and a weld rod guiding device swingably attached to said support so as to be movable transversely of the line of such movement, said device including a curved depending member grooved on its concave face to receive and direct such weld rod, and a spring tending to swing said member in the direction of its convex side.

4. In apparatus for metallic arc welding angularly related work-pieces, the combination of a support mounted for traversing movement relatively to the latter in a direction substantially parallel with the angle therebetween, and a weld rod guiding device swingably attached to said support so as to be movable transversely of the line of such movement, said device including a curved depending member grooved on its concave face to receive and direct such weld rod, a spring tending to swing said member in the direction of its convex side, and an adjustable stop limiting such swinging movement.

5. In apparatus for metallic arc welding angularly related work-pieces, the combinatiion of a support mounted for traversing movement relatively to the latter in a direction substantially parallel with the angle therebetween, and a weld rod guiding device swingably attached to said support so as to be movable transversely of the line of such movement, said device including a roller adapted for engagement with an angle defined by at least one of said work-pieces.

6. In apparatus for metallic arc welding angularly related work-pieces, the combination of a support mounted for traversing movement relatively to the latter in a direction substantially parallel with the angle therebetween, and a weld rod guiding device swingably attached to said support so as to be movable transversely of the line of such movement, said device including a roller having a substantially spherical contact face adapted to run in the angle between the work-piece.

7. In apparatus for metallic arc welding angularly related work-pieces, the combination of a support mounted for traversing movement relatively to the latter in a direction substantially parallel with the angle therebetween, and a weld rod guiding device swingably attached to said support so as to be movable transversely of the line of such movement, said device including a roller having a substantially spherical contact face adapted to run in the angle between the work-pieces and said roller being bodily adjustable about an angle transverse of the direction of travel of the apparatus.

8. In apparatus for metallic arc welding angularly related work-pieces, the combination of a support mounted for traversing movement relatively to the latter in a direction substantially parallel with the angle therebetween, and a weld rod guiding device swingably attached to said support so as to be movable transversely of the line of such movement, said device including a roller comprising two spherical segments mounted for rotation about a common axis disposed transversely of the path of movement of the apparatus.

9. In apparatus for metallic arc welding angularly related work-pieces, the combination of a support mounted for traversing movement relatively to the latter in a direction substantially parallel with the angle therebetween, a weld rod guiding device swingably attached to said support so as to be movable transversely of the line of such movement, about two, spaced parallel axes.

10. In apparatus for metallic arc welding angularly related work-pieces, the combination of a support mounted for traversing movement relatively to the latter in a direction substantially parallel with the angle therebetween, a weld rod feeding device swingably attached to said support about an axis so as to be movable transversely of the line of such movement, and a weld rod guiding device swingably attached to said feeding device about an axis spaced from but parallel with such first axis.

VLADIMIR PETERS.

REFERENCES CITED

The following references are of record in the file of this patent:

UNITED STATES PATENTS

| Number | Name | Date |
| --- | --- | --- |
| 1,508,713 | Noble | Sept. 16, 1924 |
| 1,620,220 | Morton | Mar. 8, 1927 |
| 1,667,585 | Chapman (1) | Apr. 24, 1928 |
| 1,818,859 | McIlvin | Aug. 11, 1931 |
| 1,860,172 | Chapman (2) | May 24, 1932 |
| 2,179,108 | Westberg | Nov. 7, 1939 |
| 2,182,575 | Baird et al. (1) | Dec. 5, 1939 |
| 2,189,399 | Lewbers | Feb. 6, 1940 |
| 2,314,917 | Baird (2) | Mar. 30, 1943 |
| 2,364,826 | Smith | Dec. 12, 1944 |